Figure 1:
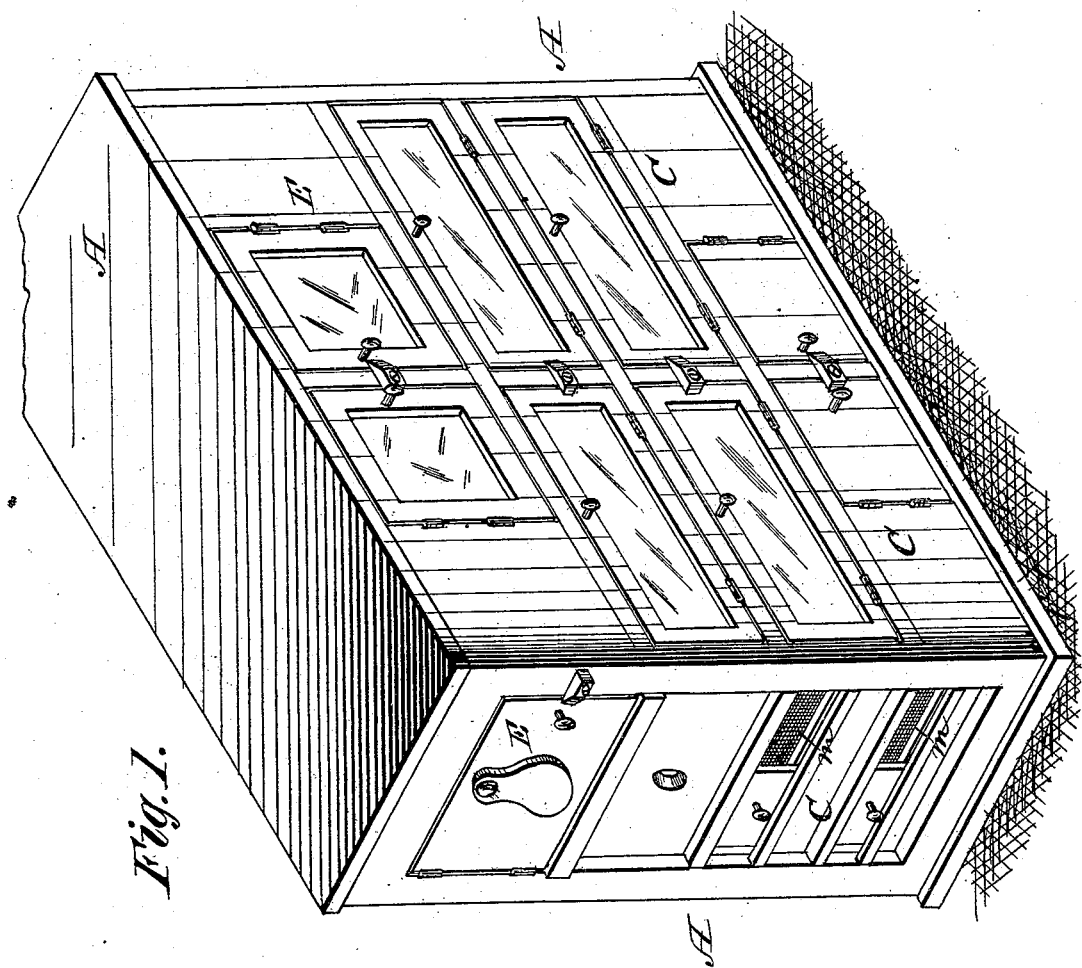

J. F. FERGUSON.
Refrigerator.

No. 226,993. Patented April 27, 1880.

2 Sheets—Sheet 1.

Witnesses:
P. C. Dieterich
Frank H. Duffy

Inventor:
James F. Ferguson
Per Charles E. Allen, Attorney

N. PETERS, PHOTO-LITHOGRAPHER, WASHINGTON, D. C.

2 Sheets—Sheet 2.
J. F. FERGUSON.
Refrigerator.
No. 226,993. Patented April 27, 1880.
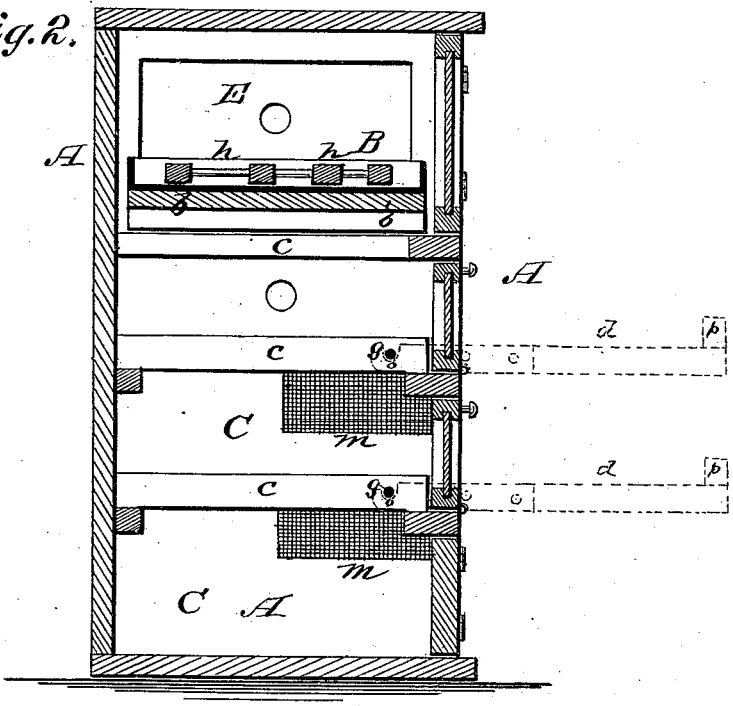
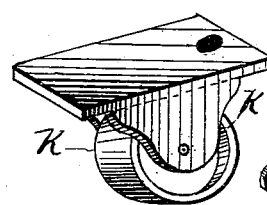
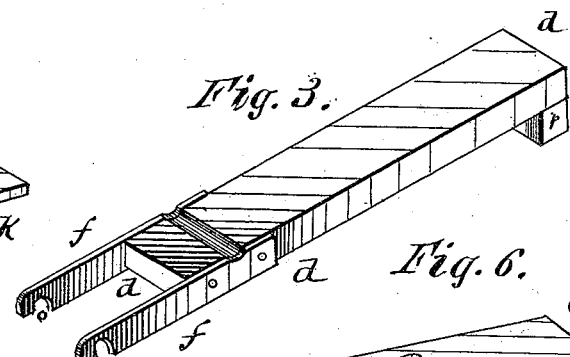
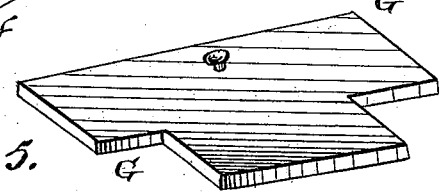
Witnesses:
P. C. Diatrich
Frank H. Duffy
Inventor:
James F. Ferguson
Per Charles E. Allen, Attorney

UNITED STATES PATENT OFFICE.

JAMES F. FERGUSON, OF BURLINGTON, VERMONT.

REFRIGERATOR.

SPECIFICATION forming part of Letters Patent No. 226,993, dated April 27, 1880.

Application filed June 9, 1877.

*To all whom it may concern:*

Be it known that I, JAMES F. FERGUSON, of the city of Burlington, in the county of Chittenden and State of Vermont, have invented certain new and useful Improvements in Milk-Bureaus; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to an improved construction of the milk-bureau for which Letters Patent were granted to the petitioner under date of August 22, 1876, and numbered 181,326.

My improvements in said patent consist, first, in an improved construction of ice-chamber provided with a spout to carry off the drip-out of the bureau, a rack to support the ice, and an inclined board placed beneath the ice-receptacle to receive the water of condensation formed on the under face of the ice-receptacle and prevent it from falling onto the milk-pans below the ice-receptacle.

My invention consists, secondly, in improvements in the devices applied to the sliding extension-shelves for supporting the milk-pans in my former patent, by means of which improvements in said devices the sliding shelves are more securely held in place when extended by means of hooked braces engaging with pins, and the milk-pans are more securely held in place by a stop on the outer end of each shelf.

My invention further consists in the application of ventilators protected by coverings opposite the several milk-divisions of my former patent, whereby a current of warm or cold air may be directed over each pan of milk separately and the temperature regulated.

My invention also consists in the employment of a portable door applied to the doorway of a division when its shelf is extended, as hereinafter more fully set forth.

In the accompanying drawings, Figure 1 is a perspective view of the milk-bureau, containing any desired number of divisions. Fig. 2 is a vertical section of the same. Fig. 3 represents the portable support $d\ d$, designed to be attached to the front ends of the cleats $c\ c$, to sustain the pans when run out in front of the milk-bureau. Fig. 4 is a perspective view of the roller which is attached to the bottom of the milk-pans. Fig. 5 is a section of the ice-pan B. Fig. 6 represents a portable door.

A is the milk-bureau, constructed preferably of wood. It is divided into any desired number of divisions by vertical and horizontal bars. The doors of these divisions in front of the bureau occupy the same relative position as the front of the drawers in the ordinary bureau.

Attached to the sides of the bureau, on the interior and at the bottom of each division, are cleats $c\ c$, upon which the ice-pan B in the upper division and the milk-pans in the lower division are intended to rest. The ice is placed on the pan B. This pan or reservoir consists of a metallic pan which is narrower than and extends the full length of the bureau, and is supported at either end by the upper cleats $c\ c$, which are attached to each end of the bureau on the inside and at the bottom of the upper division, E. A wooden shelf, $b$, is placed beneath this pan to prevent the dripping upon the milk below of water caused by the condensation of the air coming in contact with the under side of the ice-pan B.

The pan B is so arranged that it may be elevated at one end, so as to run off the waste-water through a spout, $s$, in the other end, connected with a pipe leading out of the bureau. This is effected by attaching a block, $l$, (see Fig. 5,) to the under face of one end of the shelf or board $b$, thus inclining the latter and the ice-receptacle, which rests on it.

The ice rests upon a rack, $h$, to permit a free circulation of air around it.

Between the center cleats $c\ c$ is left an open space from the ice-chamber to the bottom of the bureau. In the sides of the bureau, near the top of each division, are ventilators $m\ m$, protected with coverings, so that the orifices may be regulated at will. By means of these peculiar ventilators so located a current of warm or cold air may be directed over each pan of milk separately, and thus the temperature of each regulated distinctly from the rest. This is essential, as the temperature of the milk when placed in the bureau will vary, and equalization of temperature cannot be obtained by a single general ventilator for the entire bureau. These ventilators also enable the warm air from the heating apparatus below to be guided to any desired part of the bureau. The degree as well as the purity of the temperature is also regulated by these ventilators.

The milk-pans rest on rollers K, so that they may be more easily moved in and out of the bureau.

$d\ d$ are movable supports or extensions of the cleats $c\ c$, of a novel construction, to sustain the pans when they are rolled out in front of the bureau. Attached to either side of one end of these supports are metal braces $f\ f$, which extend out beyond the end of the support, and terminate in a socket, $o$, which is cut into its upper edge, and is made to fit around corresponding metal pins or projections $g$ in each side of and a short distance from the front end of the cleats $c\ c$, by means of which bracing they are held in a horizontal position when in place. On the upper side of the other end of the supports is a projection or stop, which prevents the pan from rolling off the supports $d\ d$ when it is rolled out upon them.

The opening made by rolling out a milk-pan can be temporarily closed by a portable door, G, to prevent change of the temperature of the bureau while handling the milk.

I am aware that a refrigerator provided with shelves sliding in loops secured to cleats attached to the inside of a refrigerator, whereby said shelves can be slid out to receive articles contained in the refrigerator, has heretofore been employed, as shown in Letters Patent granted to me for a refrigerator, dated August 22, 1876, No. 181,326, and I therefore lay no claim to such construction, my invention being confined to details of construction, as set forth in the claims.

What I claim, and desire to secure by Letters Patent, is—

1. The upper division, E, provided at its lower end with the cleats $c$, in combination with the ice-receptacle B, having the spout $s$ in its bottom, rack $h$, and board or shelf $b$, provided with the block $l$ at one end, substantially as described, and for the purpose set forth.

2. The sliding extension support $d$, provided with the stop $p$ at its outer end and the metallic braces $f\ f$ at its inner end, having sockets $o\ o$, in combination with the cleats $c\ c$, having the pins $g\ g$, substantially as described, and for the purpose set forth.

3. The milk-bureau A, provided with divisions C C, to receive the milk-pans, and an upper division, E, for the ice-pan B, cleats $c\ c$, and ventilators $m\ m$, in combination with the sliding extensions $d\ d$, having hook-supports $f\ f$, and the portable door G, substantially as described, and for the purpose set forth.

In testimony that I claim the foregoing as my own I affix my signature in presence of two witnesses.

J. F. FERGUSON.

Witnesses:
  A. B. SIMONDS,
  CHARLES E. ALLEN.